J. A. DANN.
EXTENSION AXLE.
APPLICATION FILED MAR. 14, 1921.

1,431,099.

Patented Oct. 3, 1922.

Inventor,
J. A. Dann
By C. A. Snow & Co.
Attorneys.

Patented Oct. 3, 1922.

1,431,099

UNITED STATES PATENT OFFICE.

JOSEPH A. DANN, OF MIAMI, FLORIDA.

EXTENSION AXLE.

Application filed March 14, 1921. Serial No. 452,217.

*To all whom it may concern:*

Be it known that I, JOSEPH A. DANN, a citizen of the United States, residing at Miami, in the county of Dade and State of Florida, have invented a new and useful Extension Axle, of which the following is a specification.

This invention relates to vehicle attachments, and more particularly to an attachment designed for use in connection with tractors, automobiles or the like for increasing the width of the tread of the wheels thereof, thereby adapting the wheels for use in marshy or low lands.

The primary object of the invention is to provide an extension axle which may be readily and easily applied to the usual axle of the vehicle, the axle being designed to support a wheel having a relatively wide tread portion.

A further object of the invention is the provision of means to secure the auxiliary wheel to the wheel of the vehicle associated therewith, in a manner to eliminate any possibility of the auxiliary wheel becoming disconnected from the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope if what is claimed, without departing from the spirit of the invention.

Referring to the drawing.

Figure 1:
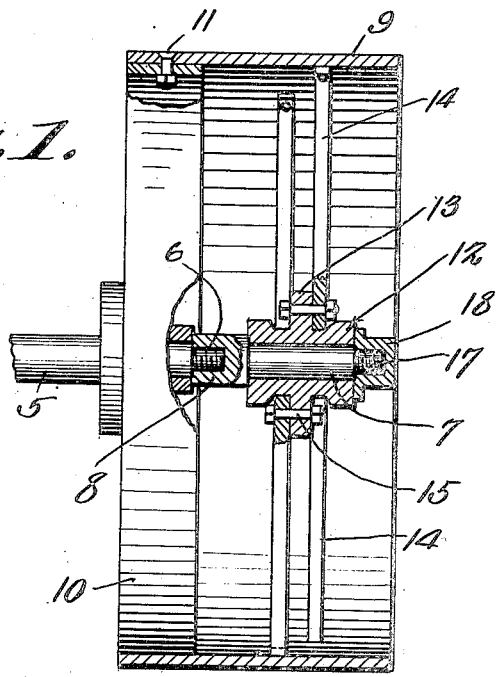
Figure 1 illustrates a side elevational view of a wheel partly broken away to illustrate the means of connection between the wheel and auxiliary wheel, the auxiliary wheel being shown in section.
Figure 2:
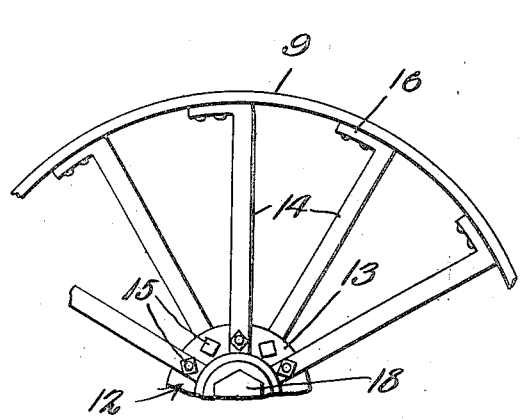
Figure 2 illustrates a fragmental detail view of the construction of the auxiliary wheel.

Referring to the drawing in detail, the reference character 5 designates an axle of a vehicle which has a threaded extremity 6 adapted to receive the usual securing nut employed for securing the wheel to the axle.

The stub axle indicated at 7, forms an important feature of the present invention, and as shown this stub axle is provided with a head 8 that has a threaded bore to accommodate the threaded extension 6, so that the stub axle 7 may be secured to the axle 5, thereby increasing the length of the axle and providing means to accommodate the auxiliary wheel to be hereinafter more fully described.

The auxiliary wheel includes a relatively wide thread portion 9, the diameter of the tread portion being greater than the diameter of the wheel 10, to which the auxiliary wheel is applied, so that portions of the tread portion 9 may overlap the tread portion of the wheel 10, whereby the same may be secured together as by means of the bolt indicated by the reference character 11.

A hub 12 forms a part of the auxiliary wheel, and comprises a circumferential flange 13 to which flange are secured the radiating spokes 14, the bolts 15 being provided to pass through suitable openings in the spokes and in the flange 13 to prevent displacement of the spokes with relation to the flange and hub. Each of the spokes has its outer extremity formed at right angles to the body portion thereof as at 16, which right angled extremity provides means to permit the spokes to be rigidly secured to the inner surface of the tread portion 9.

A threaded extension 17 is formed on the outer end of the stub axle 7 and accommodates the nut 18, which engages the outer end of the hub of the auxiliary wheel to force the same inwardly and prevent lateral movement of the auxiliary wheel with relation to the axle 7.

Figure 3:
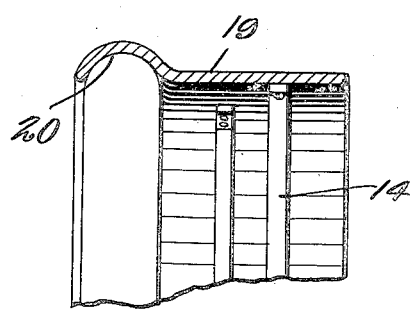
Figure 3 illustrates a modified form of the invention as employed in connection with automobile wheels.

In the modified form of the invention as illustrated by Figure 3 of the drawing, the auxiliary wheel includes a relatively wide tread portion 19, which is provided with a circumferential groove 20, constructed to conform to the curvature of a pneumatic tire of a motor vehicle, so that the auxiliary wheel may be applied by deflating the tire and positioning the groove of the tread 19 over the tire, whereupon inflation of the tire will cause the tire to bind within the groove 20, and securely connect the auxiliary wheel to the motor vehicle wheel to be associated therewith.

In the use of the device the usual securing nut is removed from the threaded portion of its axle, and the stub axle 7 is secured thereto by threading the head 8 over the threaded extension 6, whereupon the auxiliary wheel may be slid into position on the stub axle and secured thereto as by means of the nut 18.

It might be further stated that wheel employed in combination with the extension axle, may be secured in any desired manner, as by means of set-screws, cap-screws, cotter pins or the like.

When a nut is used as the securing device, the nut cooperates with the wheel hub to completely house the end of the axle.

Having thus described the invention, what is claimed as new is:—

In combination with a wheel and the threaded extension of the axle on which the wheel is supported, a stub axle having a head formed with a threaded opening adapted to be positioned over the threaded extension of the axle, an auxiliary wheel including a hub and a relatively wide rim section, spokes for connecting the hub and rim section at a point adjacent to one edge of the rim section, means for securing the auxiliary wheel on the stub axle, said tread section being of a diameter greater than the wheel associated therewith, said rim section adapted to fit over the rim of the wheel associated therewith, and means for securing the rim of the auxiliary wheel to the rim of the wheel associated therewith.

In testimony that I claim the foregoing as my own, I have hereto affixed my signature in the presence of two witnesses.

JOSEPH A. DANN.

Witnesses:
 JESS R. CLOW,
 F. C. BUSH.